(12) United States Patent
Crawford

(10) Patent No.: US 7,044,445 B1
(45) Date of Patent: May 16, 2006

(54) HYDRAULIC-MECHANICAL VEHICLE ELEVATING SYSTEM

(76) Inventor: Jerry L. Crawford, 7661 Dylan Rd., Hernando, MS (US) 38632

( * ) Notice: Subject to any disclaimer, the term of this patent is extended or adjusted under 35 U.S.C. 154(b) by 174 days.

(21) Appl. No.: 10/741,356

(22) Filed: Dec. 19, 2003

(51) Int. Cl.
*B66F 7/04* (2006.01)
(52) U.S. Cl. .................................................. 254/425
(58) Field of Classification Search ............ 254/423, 254/425, 424, 418
See application file for complete search history.

(56) References Cited

U.S. PATENT DOCUMENTS

| | | | |
|---|---|---|---|
| 1,937,170 A | * | 11/1933 | Smith ..................... 254/425 |
| 4,993,688 A | | 2/1991 | Mueller et al. |
| 5,219,429 A | | 6/1993 | Shelton |
| 5,228,651 A | | 7/1993 | Warner |
| 5,232,206 A | | 8/1993 | Hunt et al. |
| D348,966 S | | 7/1994 | Guyton |
| 5,377,957 A | | 1/1995 | Mosley |

* cited by examiner

*Primary Examiner*—Robert C. Watson

(57) ABSTRACT

A hydraulic-mechanical vehicle elevating system for providing a built-in jack assembly which elevates a vehicle so the vehicle may be maintained. The hydraulic-mechanical vehicle elevating system includes a plurality of hydraulic jacks and/or mechanical jacks secured to a frame of a vehicle, a hydraulic pump connected to a reservoir and a control panel which controls fluid flow to the hydraulic jacks, and a crank handle.

7 Claims, 4 Drawing Sheets

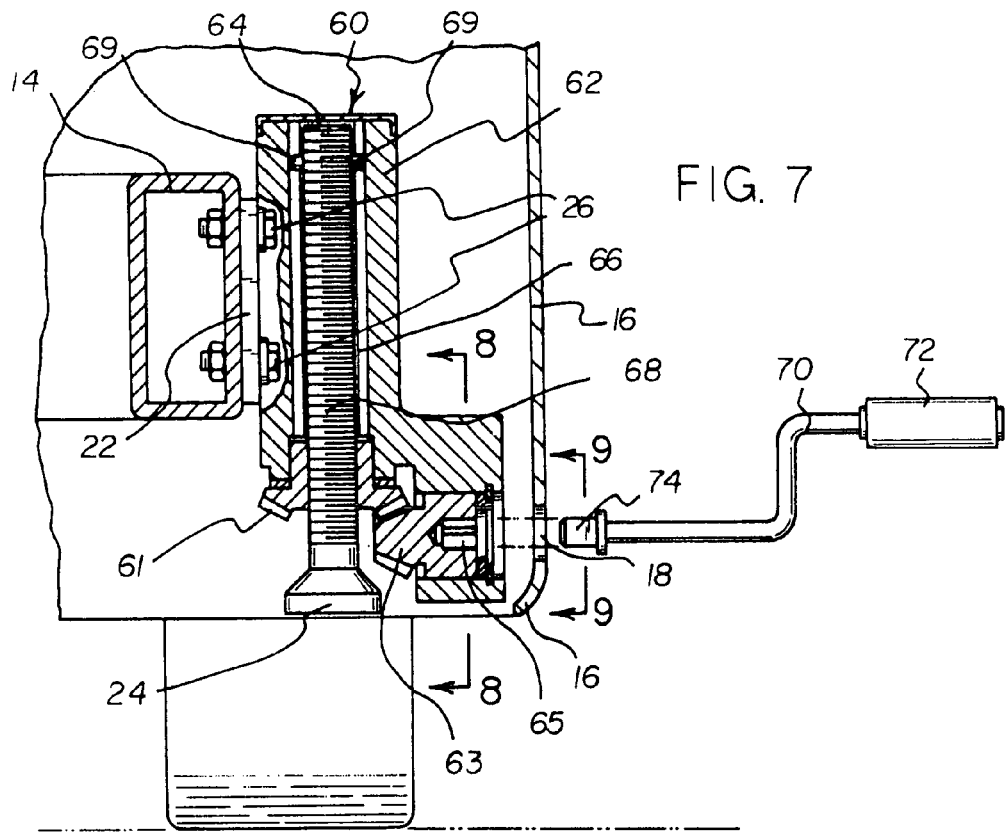
FIG. 7
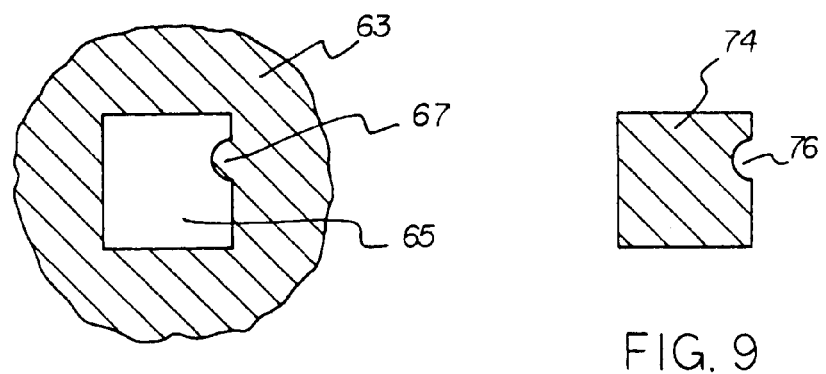
FIG. 8
FIG. 9

HYDRAULIC-MECHANICAL VEHICLE ELEVATING SYSTEM

BACKGROUND OF THE INVENTION

1. Field of the Invention

The present invention relates to vehicle jacking devices and more particularly pertains to a new hydraulic-mechanical vehicle elevating system for providing a built-in jack assembly which elevates a vehicle so the vehicle may be maintained.

2. Description of the Prior Art

The use of vehicle jacking devices is known in the prior art. U.S. Pat. No. 5,219,429 describes a system for controllably raising or lower a portion of a vehicle. Another type of vehicle jacking device is U.S. Pat. No. 5,232,206 having a air jack assembly that is mounted to the underside of a vehicle and selectively raise or lower a portion of the vehicle. U.S. Pat. No. 5,377,957 has at least one hydraulic jack pivotally mounted to the vehicle and is for raising or lowering a portion of a vehicle. U.S. Pat. No. 5,228,651 has a jack stand that is pivotally coupled to a vehicle and is pivoted to support the vehicle when the vehicle is driven in a direction that pivots the jack stand under the vehicle. U.S. Pat. No. 4,993,688 has a pneumatic jack system that is coupled to a vehicle to selectively raise or lower a portion of the vehicle. U.S. Pat. No. Des. 348,966 shows a vehicle mounted hydraulic auto jack.

While these devices fulfill their respective, particular objectives and requirements, the need remains for a system that has certain improved features providing a built-in jack assembly which elevates a vehicle so the vehicle may be maintained.

SUMMARY OF THE INVENTION

The present invention meets the needs presented above by providing a plurality jacks secured to a frame of a vehicle to selective raise and lower the vehicle.

Still yet another object of the present invention is to provide a new hydraulic-mechanical vehicle elevating system that providing a built-in jack assembly which elevates a vehicle so the vehicle may be maintained.

Even still another object of the present invention is to provide a new hydraulic-mechanical vehicle elevating system that a plurality of hydraulic jacks and/or mechanical jacks secured to a frame of a vehicle, a hydraulic pump connected to a reservoir and a control panel which controls fluid flow to the hydraulic jacks, and a crank handle.

To this end, the present invention generally comprises a plurality of hydraulic jacks and/or mechanical jacks secured to a frame of a vehicle, a hydraulic pump connected to a reservoir and a control panel which controls fluid flow to the hydraulic jacks, and a crank handle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a cut away view of an alternative embodiment disclosing a mechanical jack.

FIG. 8 is a cross sectional view taken along line 8—8 from FIG. 7.

FIG. 9 is a cross sectional view taken along line 9—9 from FIG. 7.

DESCRIPTION OF THE PREFERRED EMBODIMENT

Figure 1:
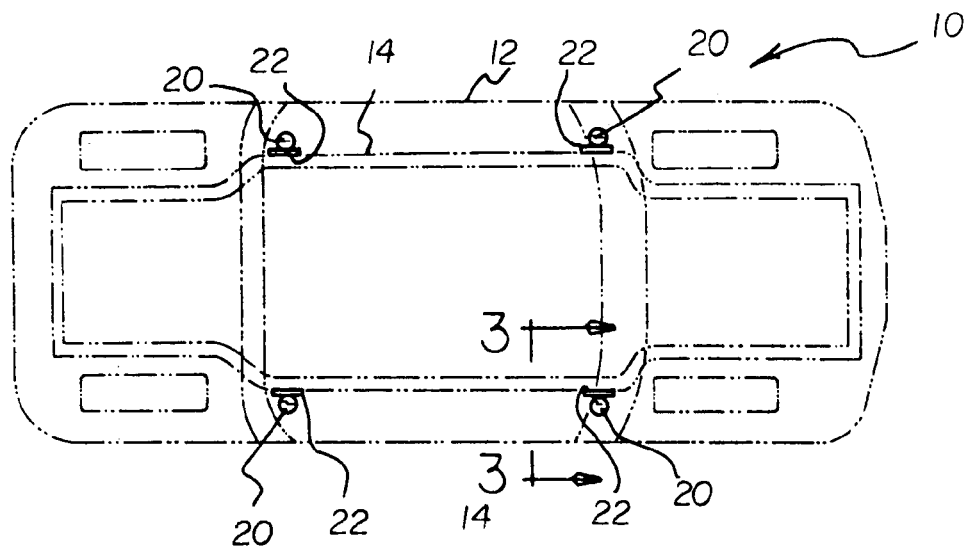
FIG. 1 is a top view of a new Hydraulic-Mechanical Vehicle elevating system according to the present invention.
Figure 2:
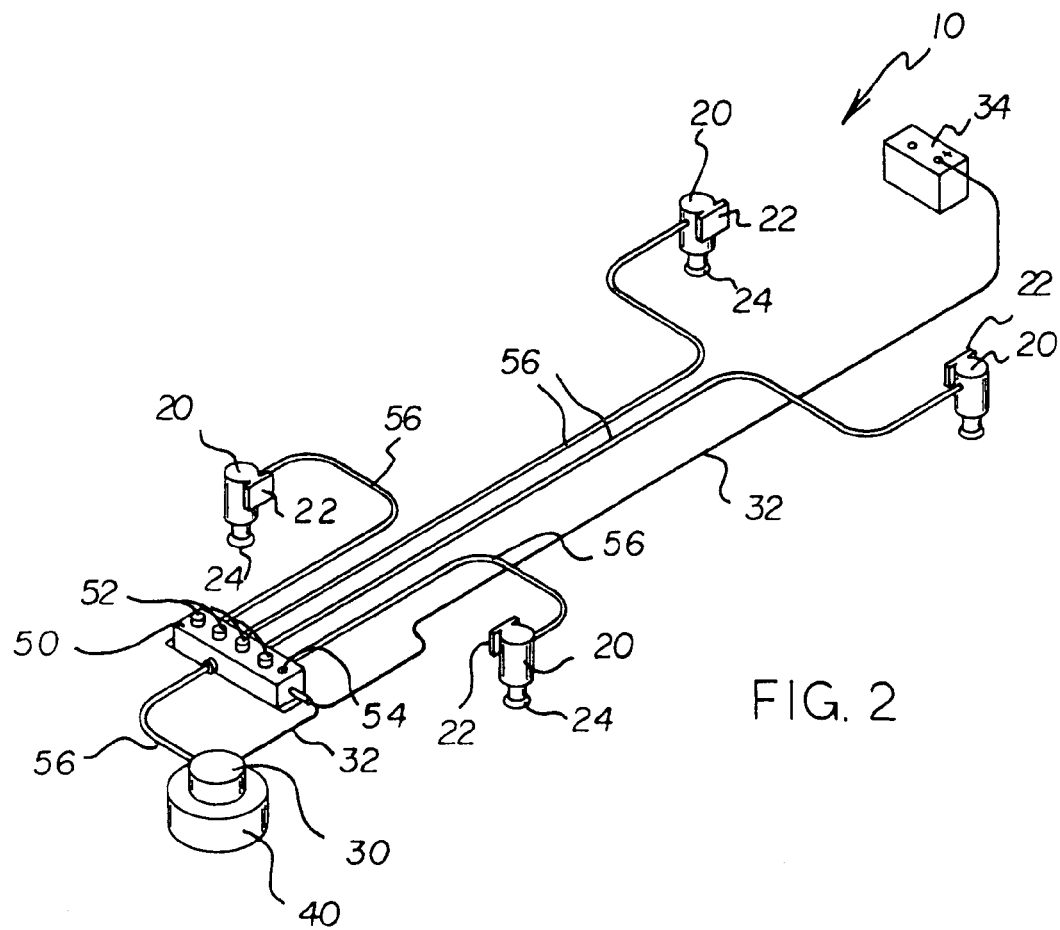
FIG. 2 is an upper perspective view of the present invention.
Figure 3:
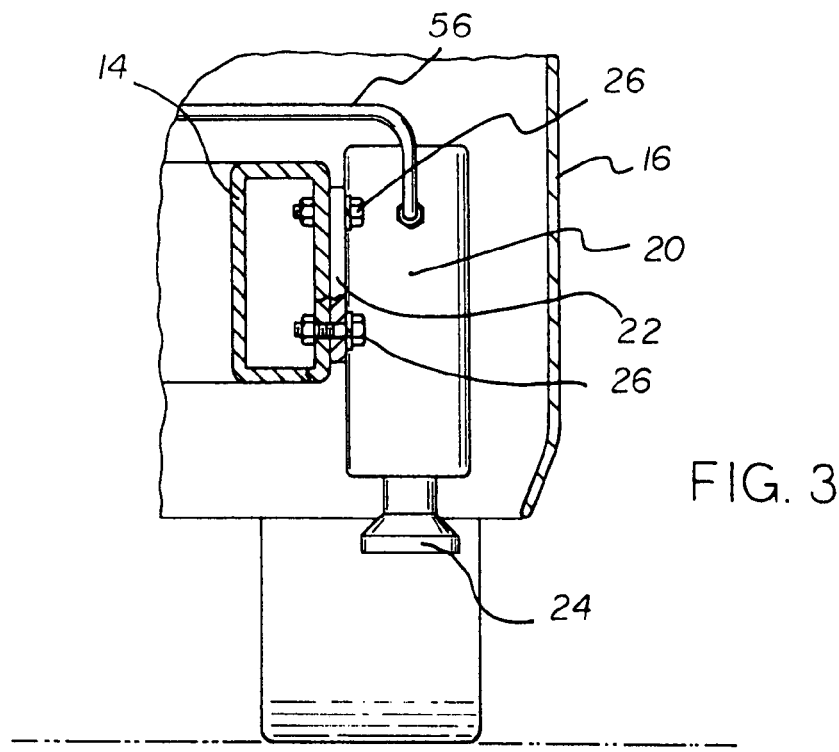
FIG. 3 is a cross sectional view taken along line 3—3 of FIG. 1 disclosing the hydraulic jack in the storage position.
Figure 4:
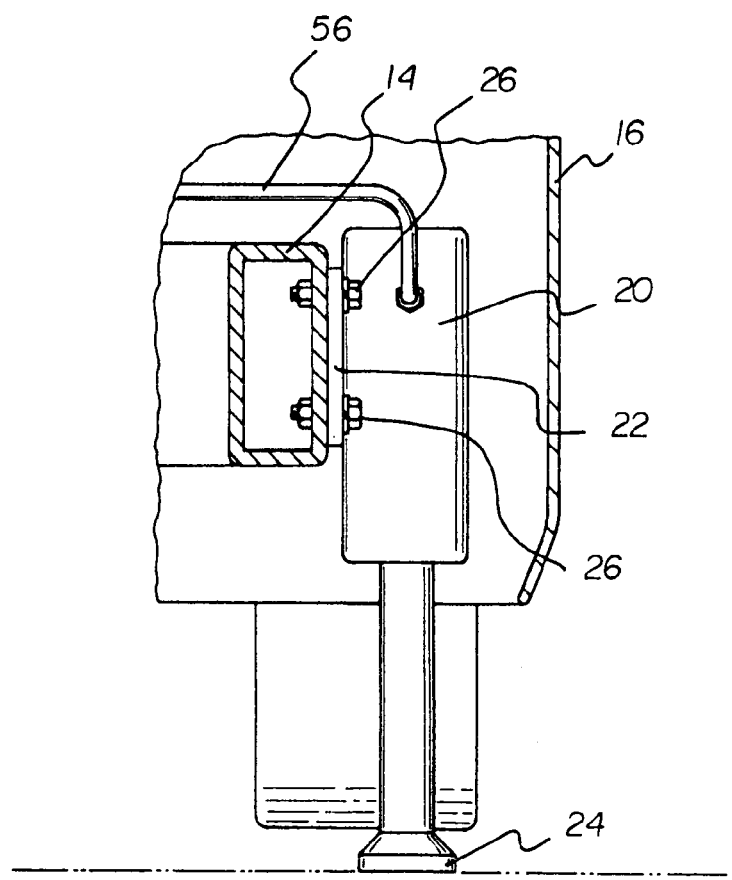
FIG. 4 is a view from FIG. 3 disclosing the hydraulic jack in the extended position.

With reference now to the drawings, and in particular to FIGS. 1 through 9 thereof, a new hydraulic-mechanical vehicle elevating system embodying the principles and concepts of the present invention and generally designated by the reference numeral 10 will be described.

Figure 5:
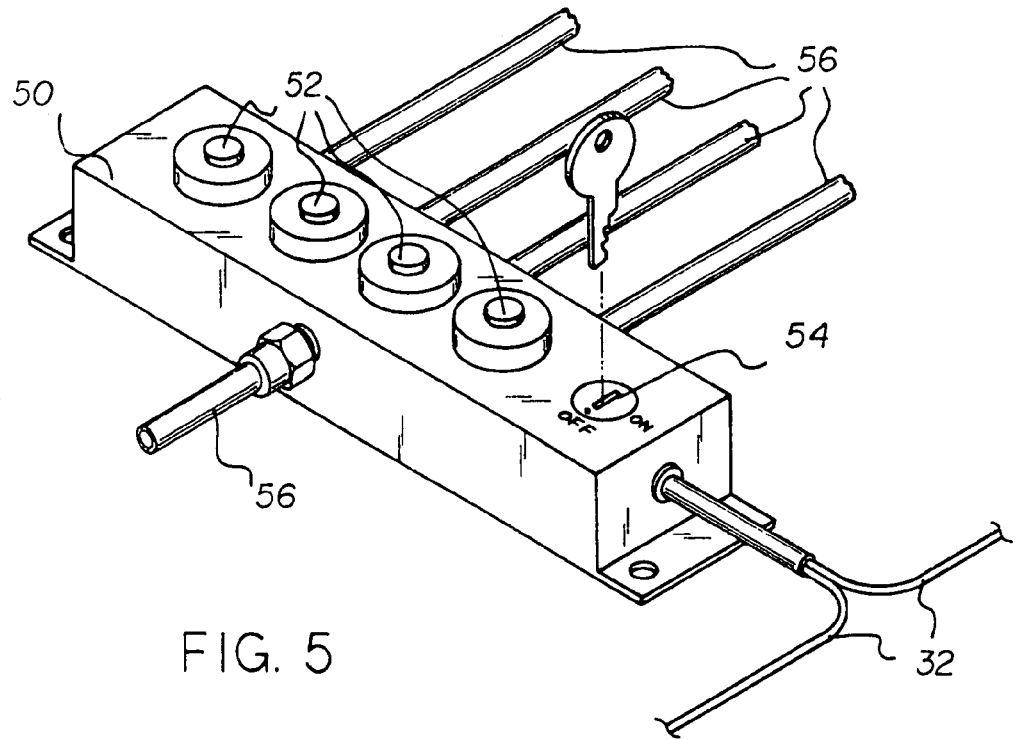
FIG. 5 is an upper side perspective view of the control panel.
Figure 6:
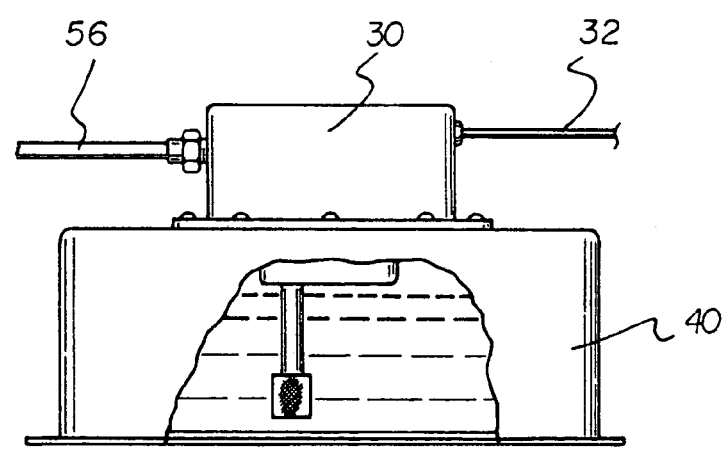
FIG. 6 is a cut away side view of the hydraulic pump and reservoir.

As best illustrated in FIGS. 1 through 9, the hydraulic-mechanical vehicle elevating system 10 generally comprises at least one hydraulic jack 20 having a bracket 22 secured to a frame 14 of a vehicle 12 by a plurality of fasteners 26 for elevating a vehicle 12 as shown in FIGS. 1 through 4 of the drawings. A control panel 50 is connected to the hydraulic jack 20 by a high-pressure tube 56 as shown in FIG. 5 of the drawings. The control panel 50 controls the flow of a hydraulic fluid to the hydraulic jack 20 thereby controlling the length of the hydraulic jack 20. A hydraulic pump 30 is connected to a reservoir 40 at one end as shown in FIG. 6 of the drawings. The hydraulic pump 30 is connected to the control panel 50 opposite of the hydraulic jack 20 by another high-pressure tube 56 for producing hydraulic pressure to extend or contract the hydraulic jack 20. The hydraulic jack 20 and the mechanical jack 60 both include a footing 24 for engaging the ground during operation. The control panel 50 includes a plurality of valves 52 controlled by manual manipulation of a user for controlling the hydraulic fluid flow to the hydraulic jack 20. The control panel 50 also has a key switch 54 for activating the control panel 50. The control panel 50 is also electrically coupled to a power source 34 within the vehicle 12 by a cable 32 and thereafter the cable 32 is electrically coupled to the hydraulic pump 30 for controlling the supply of electrical power to the hydraulic pump 30.

In an alternative embodiment as shown in FIGS. 7 through 9, at least one mechanical jack 60 is secured to the frame 14 of the vehicle 12 for elevating the vehicle 12 providing a backup in the event that the hydraulic jack 20 is inoperable. Alternatively, the mechanical jack 60 would be secured to the frame 14 without the hydraulic jack 20 connected. A crank handle 70 is specially formed to engage the mechanical jack 60 for elevating the vehicle 12 as shown in FIG. 7 of the drawings. The mechanical jack 60 comprises a housing 62 having a passage 64 extending through a longitudinal axis of the housing 62 and exposed at a bottom portion of the housing 62 as best shown in FIG. 7 of the drawings. A threaded shaft 68 slidably projects through the passage 64. At least one rabbet 66 projects into the housing 62 within the passage 64 parallel to the longitudinal axis of the passage 64 for receiving a spline 69 secured to the threaded shaft 68 for preventing rotation of the threaded shaft 68. An internally threaded bevel gear 61 threadably engages the threaded shaft 68 and rotatably engages the bottom portion of the housing 62 as shown in FIG. 7 of the drawings. A drive bevel gear 63 mechanically engages the internally threaded bevel gear 61 and rotatably engages the housing 62 along an orthogonal axis to the longitudinal axis as shown in FIG. 7 of the drawings for rotating the internally threaded bevel gear 61 for extending and contracting the threaded shaft 68 from within the passage 64. The drive bevel gear 63 includes a rectangular cavity 65 opposite of the internally threaded bevel gear 61. A security nub 67 is secured within the rectangular cavity 65 for selectively receiving a selected crank handle 70 as best shown in FIG. 8 of the drawings. The purpose of the rectangular cavity 65 within drive bevel gear 63 is to provide a uniform structure within the housing 62 to prevent snagging upon debris and other objects during traveling of the vehicle 12. The crank handle 70 includes a rotating grip 72 rotatably secured at one end. A rectangular end 74 is secured at an end opposite of the rotating grip 72 for engaging the rectangular cavity 65. The rectangular end 74 includes a security groove 76 for receiving the security nub 67 of the rectangular cavity 65 as best shown in FIG. 9 of the drawings. An aperture 18 projects into a fender 16 of the vehicle 12 allowing insertion of the crank handle 70 to engage the rectangular cavity 65 as shown in FIG. 7 of the drawings.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A Mechanical Vehicle Elevating System, comprising:
   at least one mechanical jack secured to a frame of a vehicle for elevating said vehicle;
   a crank handle specially formed to engage said mechanical jack for elevating said vehicle;
   wherein said mechanical jack comprises
       a housing having a passage extending through a longitudinal axis of said housing and exposed at a bottom portion of said housing;
       a threaded shaft slidably projecting through said passage;
       at least one rabbet into said housing within said passage for receiving a spline secured to said threaded shaft for preventing rotation of said threaded shaft;
       an internally threaded bevel gear threadably engaging said threaded shaft and rotatable engaging said bottom portion of said housing;
       a drive bevel gear mechanically engaging said internally threaded bevel gear and rotatably engaging said housing along an orthogonal axis to said longitudinal axis; and
       said drive bevel gear includes a rectangular cavity opposite of said internally threaded bevel gear and a security nub within said rectangular cavity for selectively receiving a selected crank handle.

2. The Mechanical Vehicle Elevating System of claim 1, wherein said crank handle includes:
   a rotating grip rotatably secured at one end;
   a rectangular end secured at an end opposite of said rotating grip for engaging said rectangular cavity; and
   said rectangular end includes a security groove for receiving said security nub of said rectangular cavity.

3. The Mechanical Vehicle Elevating System of claim 2, including an aperture projecting into a fender of said vehicle allowing insertion of said crank handle to engage said rectangular cavity.

4. A Hydraulic-Mechanical Vehicle Elevating System, comprising:
   at least one hydraulic jack having a bracket secured to a frame of a vehicle by a plurality of fasteners for elevating a vehicle;
   a control panel connected to said hydraulic jack by a high-pressure tube, wherein said control panel controls the flow of a hydraulic fluid to said hydraulic jack thereby controlling the length of said hydraulic jack;
   a hydraulic pump connected to a reservoir storing said hydraulic fluid at one end and connected to said control panel opposite of said hydraulic jack for producing hydraulic pressure to extend said hydraulic jack;
   at least one mechanical jack secured to a frame of a vehicle for elevating said vehicle in the event that said hydraulic jack is inoperable; and
   a crank handle specially formed to engage said mechanical jack for elevating said vehicle.

5. The Hydraulic-Mechanical Vehicle Elevating System of claim 4, wherein said hydraulic jack includes a footing for engaging ground during operation.

6. The Hydraulic-Mechanical Vehicle Elevating System of claim 5, wherein:
   said control panel includes a plurality of valves controlled by manual manipulation of a user for controlling said hydraulic fluid flow to said hydraulic jack;
   said control panel includes a key switch for activating said control panel;
   said mechanical jack comprises:
       a housing having a passage extending through a longitudinal axis of said housing and exposed at a bottom portion of said housing;
       a threaded shaft slidably projecting through said passage;
       at least one rabbet into said housing within said passage for receiving a spline secured to said threaded shaft for preventing rotation of said threaded shaft;
       an internally threaded bevel gear threadably engaging said threaded shaft and rotatably engaging said bottom portion of said housing;
       a drive bevel gear mechanically engaging said internally threaded bevel gear and rotatably engaging said housing along an orthogonal axis to said longitudinal axis; and
       said drive bevel gear includes a rectangular cavity opposite of said internally threaded bevel gear and a security nub within said rectangular cavity for selectively receiving a selected crank handle.

7. The Hydraulic-Mechanical Vehicle Elevating System of claim 6, wherein said crank handle includes:
   a rotating grip rotatably secured at one end;
   a rectangular end secured at an end opposite of said rotating grip for engaging said rectangular cavity;
   said rectangular end includes a security groove for receiving said security nub of said rectangular cavity; and
   an aperture projecting into a fender of said vehicle allowing insertion of said crank handle to engage said rectangular cavity.

* * * * *